United States Patent [19]
Moore

[11] 3,895,529
[45] July 22, 1975

[54] FLOWMETER COMPENSATING SYSTEM
[75] Inventor: James E. Moore, Reseda, Calif.
[73] Assignee: Waugh Control Corporation, Van Nuys, Calif.
[22] Filed: Feb. 11, 1974
[21] Appl. No.: 441,016

Related U.S. Application Data
[63] Continuation of Ser. No. 179,755, Sept. 13, 1971, abandoned.

[52] U.S. Cl. .......................... 73/194 M; 235/151.34
[51] Int. Cl. .............................................. G01f 1/00
[58] Field of Search ......... 73/194 R, 194 M, 231 R, 73/231 M; 235/151.34, 151.3, 150.52

[56] References Cited
UNITED STATES PATENTS

| | | | |
|---|---|---|---|
| 3,425,274 | 2/1969 | Clement et al. | 73/194 M |
| 3,588,481 | 6/1971 | Stroman | 235/151.34 |
| 3,610,898 | 10/1971 | Yamamoto | 235/151.34 |
| 3,614,892 | 10/1971 | Ottenstein | 73/231 R X |
| 3,724,720 | 4/1973 | Bullivant | 222/55 |

*Primary Examiner*—Richard C. Queisser
*Assistant Examiner*—John P. Beauchamp
*Attorney, Agent, or Firm*—Robert E. Geauque

[57] ABSTRACT

A fluid flow measuring system in which input pulses from a pulse-producing volumetric flow transducer and an analog signal representing the fluid temperature, pressure, density or other variable are processed to yield a corrected series of output pulses corresponding to net (processes corrected) mass or standard units of flow measurement. Correction for flow transducer calibration factor and resolution of the numerical output may be selectively adjusted. Both total flow and flow-rate over a range of fluid temperatures may be measured in net standard units of measurement.

13 Claims, 4 Drawing Figures

JAMES E. MOORE
INVENTOR

BY R.E. Geauque
ATTORNEY

JAMES E. MOORE
INVENTOR.

BY R.E. Geaugue
ATTORNEY

JAMES E. MOORE
INVENTOR.

BY R. S. Granger
ATTORNEY

3,895,529

FLOWMETER COMPENSATING SYSTEM

This is a continuation of application Ser. No. 179,755 filed Sept. 13, 1971, now abandoned.

BACKGROUND OF THE INVENTION

Heretofore various techniques have been proposed for compensating flow meters for the effects of a variable magnitude of a condition which affects the volume of the fluid whose flow is to be measured. Most fluids have physical properties which are responsive to changes in environmental conditions to affect the volume of the fluid that is to be measured by the flow meter. For example, as the pressure and temperature of a gas varies, the quantity measured by a flowmeter also varies. It is normally required that the measured flow be corrected to a set of standard conditions so that the true flow through the flow meter may be derived.

One technique for accomplishing the desired correction is shown in U.S. Pat. No. 3,176,514 wherein pulses from a pulse-producing flowmeter are supplied to a counting means through a switching circuit that is interrupted in response to the magnitude of the condition for which the flow rate is being compensated. Thus, pulses are dropped from the signal train to affect the required compensation. This has an adverse effect on the resoultion or precision of measurement since some of the pulses are dropped when the compensated variable changes in one direction. Another scheme of the prior art converts the pulse-train output from the flow meter to an analog signal which is then combined with the analog signal from a temperature sensing (or other parometer sensing transducer) element. The combined or summed analog signals are then converted back into digital signals for totalizing or other utilization. This technique suffers from the errors widely recognized as being common to analog signal processing circuits. To overcome the shortcomings of the two above-mentioned types of systems of the prior art, it has been suggested to gate the pulses derived from a reference oscillator in accordance with one variable (e.g., temperature) and combine the gated oscillator pulses with the pulses obtained from the flow meter. However, this technique yields an irregular pulse output which is susceptible to errors of the same order of magnitude as other generally unsatisfactory prior art systems. Additionally, this last-mentioned system must rely on an analog control of the reference oscillator's output.

SUMMARY OF THE INVENTION

There is provided by the present invention a novel and improved flow meter compensating system which provides fully-digital correction of signals from pulse-producing flow transducers. Either liquid or gas flow may be totalized, and either may be measured in volume units corrected to standard conditions, or in weight units. The totalizer, when compensating for temperature, satisfies the equation:

$F$ net $= K_2 F$ in $[1 - K_1(T - T\text{ ref})]$ where:
$F$ net $=$ output frequency
$F$ in $=$ input frequency
$T = $ fluid temperature
$T$ ref $=$ reference temperature (typically 60°F.)
$K_1 = $ temperature coefficient (% /°F.)
$K_2 = $ flowmeter calibration factor select and division factor coefficient The system functions to increase the number of digital output pulses obtained for each pulse generated by the flow sensor when the temperature (or other compensated variable) changes in a first direction from the standard condition and to decrease the number of digital output pulses obtained for each pulse generated by the flow transducer when the compensated variable changes in the opposite direction. When standard conditions exist (e.g., a fluid temperature of 60°F.) then there will be a one-for-one correspondence between the digital output pulses obtained from the system and those generated by the flow transducer.

Another novel feature of the invention is the provision of means whereby the effective resolution of the compensating circuit is greatly enhanced. This is accomplished by diverting the input pulses into a first signal channel where the input frequency is multiplied by 0.75 and into a second signal channel where the input frequency is multiplied by 0.25 and a temperature-dependent factor. The outputs of the two signal channels are then combined to yield the true compensated output signal frequency.

DESCRIPTION OF THE PREFERRED EMBODIMENT

Figure 1:
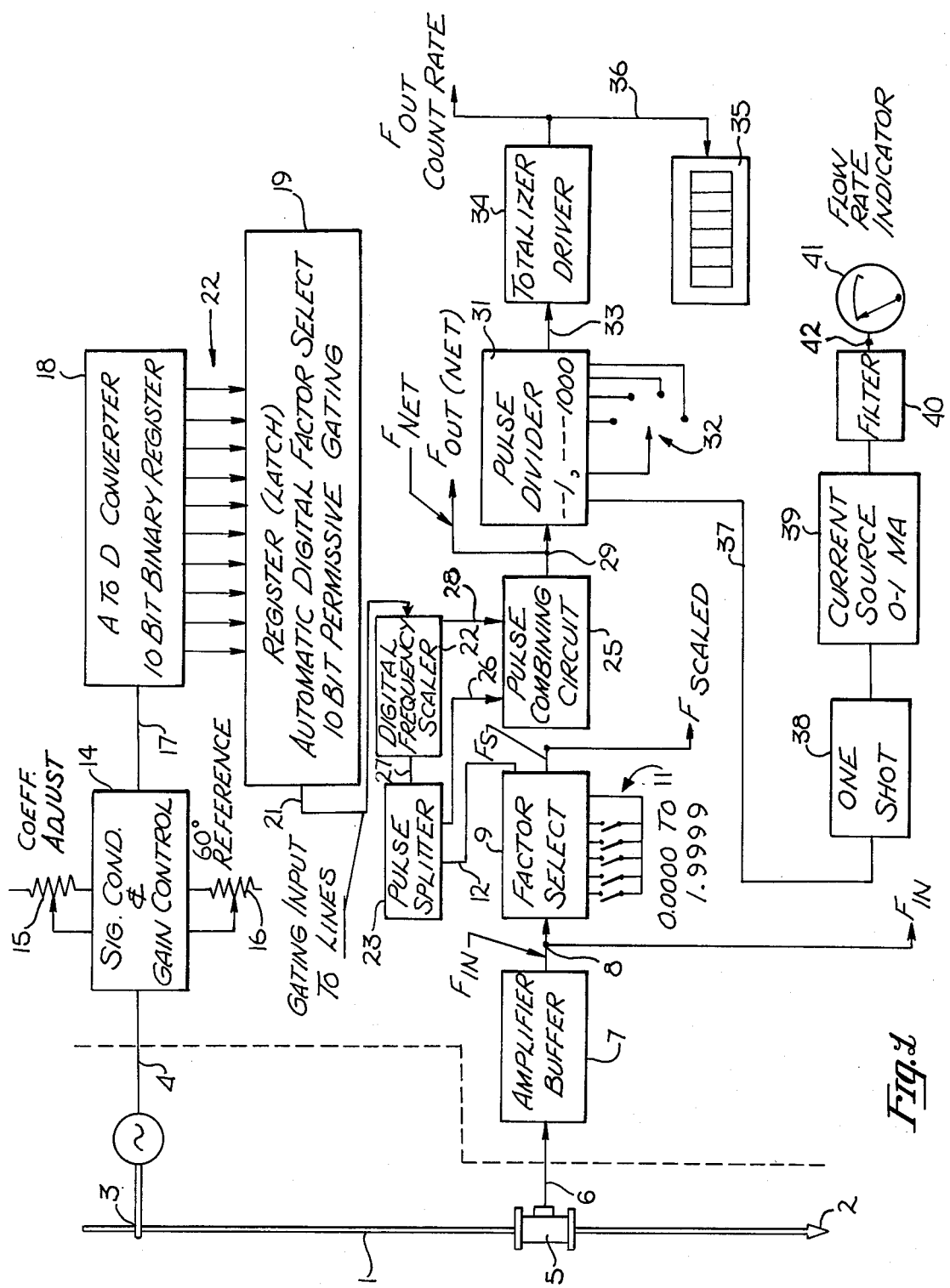
FIG. 1 is a block diagram of flow measuring system, according to the invention, showing the major components of the system.

There is shown in FIG. 1 an exemplary flow measuring system which provides automatic compensation for changes in the temperature of the fluid being measured, and which incorporates the novel digital signal compensation apparatus of the invention. The fluid being metered may comprise either a liquid or gas, depending upon the intended use for which the system is designed. The flow stream is contained within conduit 1, and moves in the direction of arrow 2. The temperature of the fluid stream is sensed by means of resistance thermometer 3 which is located at conduit 1 either upstream or downstream of the flowmeter. Thermometer 3 may comprise a thermistor probe or resistance-wire through which there is passed a constant current from a suitable source (not shown) to provide a variable voltage analog on line 4 which is proportional to the temperature of the fluid in conduit.

A pulse-producing volumetric flow transducer 5 is located in conduit 1 downstream of temperature probe 3, and may comprise a turbine flowmeter, a positive-displacement flowmeter, a vortex shedding flowmeter, or other suitable flow transducer of the type which produces a train of discrete pulses proportional to volumetric fluid flow therethrough. The pulse train from transducer 5 appears on line 6 and is sent to amplifier buffer 7. The pulse train on line 6 is amplified and shaped in buffer 7 and is supplied on line 8 as the frequency input signal (F in) to the system. A "factor select" multiplier circuit 9 may optionally be made responsive to the pulse signals on line 8. Switch 11 is a five digit thumbwheel switch to set in the multiplication factor. The factor select circuit 9 permits the input frequency to be selectively multiplied by any desired, manually selected, number between 0.0000 and 1.9999 in order to modify the flow transducer output in accordance with its required calibration factor. A factor multiplication range of 0.0000 to 1.9999 permits the number of output pulses to be adjusted through a range of 0 to 19.999 for every 10,000 input pulses. When this option is not employed, the pulse multiplication factor is 1.0000; hence there will be one output pulse on every input pulse. This optional adjustment of the input frequency permits scaling of the transducer's 5 output so as to conform to convenient units of measurement. That is, the factor select circuit 9 accommodates flow transducer having calibration factors which are not whole numbers dividible by 10. The manually entered factor digitally multiplies the transducer's calibration factor by a value which will yield a divisible factor. For example, if the transducer 5 has a given calibration factor of 274.7 pulses per barrel, the required factor select setting will be 0.3639 and will yield: 274.7 pulses/BBL × 0.3639 = 100 pulses/BB1. The scaled frequency ($F_s$) from circuit 9 is supplied via line 12 to pulse splitter 23.

The D-C analog signal from temperature probe 3 is processed in signal conditioning and gain control circuit 14. This circuit 14 includes a temperature coefficient adjustment 15 which is manually set to conform with the fluid's temperature coefficient of expansion. Also, this circuit 14 is provided with a 60° reference control 16 which is used to establish the proper output on line 17 for standard conditions at 60°F. The adjusted analog voltage which appears on line 17 is supplied to an analog-to-digital converter 18 where it is digitized to provide a 10-bit binary number. The 10-bit binary number representing $K_1T - T_{ref}$) from converter 18 is stored in latching register 19. The function of register 19 is ultimately to permit the passage of a percentage of input pulses to be transmitted from the flow transducer 5 to the output of the system. The digital output from register 19 is supplied on 10 gating lines 21 to digital frequency scaler 22.

The pulse output appearing on line 12 is supplied to pulse splitter 23 which directs one out of every four input pulses to scaler 22 via line 27. The remaining three out of every four input pulses are directed to one input of pulse combining circuit 25 via line 26.

Digital frequency scaler 22 is gated by the output from register 19 to allow certain of the pulses on line 27 to pass to pulse combining circuit 25 (via line 28), while either doubling or inhibiting others. Thus, this arrangement performs a function similar to factor select circuit 9 except that the multiplication factor is automatically set in accordance with the fluid temperature (as sensed by probe 3) and the temperature coefficient adjustment 15. The pulses on line 26 (representing the input frequency multiplied by 0.75). and the pulses on line 28 (representing the input frequency multiplied by 0.25 and a temperature-dependent multiplier) are combined in pulse combining circuit 25 to yield a compensated pulse signal frequency (F net) on line 29.

At a standard temperature of 60°F., the output frequency (F net) on line 29 will be equal to the input frequency appearing on line 12. As the fluid temperature increases, the compensated output frequency (F net) on line 29 will decrease. Conversely, a decrease in temperature will cause an increase in output frequency.

The novel technique of directing only one out of every four pulses through the temperature compensating circuit, and thereafter combining this compensated signal with the remaining three out of four input pulses, increases the resolution of compensation from 10 binary bits to a resolution of 12 binary bits, and limits the range of compensation to ±25 percent. That is, this arrangement trades an increase in resolution for a decrease in the range of permissible variation.

The compensated output signal (F net) on line 29 is supplied to pulse divider 31 where it may be divided by a manually selected factor 1, 10, 100, or 1,000, as may be required to give the appropriate resolution of the displayed output. Manual selection of the divisor is accomplished by selector switch 32. The scaled (divided) pulse-train output on line 33 is amplified by a totalizer driver 34, which in turn drives a six-digit display totalizer 35 via line 36. The numerical output displayed on totalizer 35 represents the total quantity of fluid passing through conduit 1, and is displayed in selected standard units of measurement.

The corrected output pulse signal train on line 29 may also be used to provide an indication of net flow rate. The temperature-compensated signal is supplied via line 37 to one-shot multivibrator 38, which in turn provides a pulse of fixed width for each incoming pulse. These constant-width pulses are used to control the supply of constant current pulses, from source 39, to a smoothing (integrating) filter. The filter output averages the D-C value and supplies it to a meter 41, via line 42, for display. As the input frequency on line 37 increases, the effective duty cycle of the pulse waveform derived from source 39 increases to produce a proportionally increased average D-C output to the meter 41. To provide an appropriate resolution, pulse divider 31 is used to supply a signal frequency on line 37 which is one-fifth of the output signal frequency appearing on line 29. Flow rate, as shown on meter 41, is in convenient standard units of measurement.

Having described the general features and components of a system in which the present invention is embodied, the functioning of the compensating portion of the system will be described in greater detail together with a more detailed description of its construction. Like reference numbers correspond to like parts in FIGS. 2 and 3. Each of the various circuit elements shown in the functional block diagram of FIG. 2 comprise devices well-known to those versed in the art; therefore, it is deemed unecessary to describe each blocl of said diagram in detail beyond its functional specification. It will be obvious that any of the various and suitable gates, counters, amplifiers, multivibrators, and other logic and control elements, known to those versed in the art, may be incorporated into a practical construction of the apparatus herein disclosed without the exercise of invention.

Figure 2:
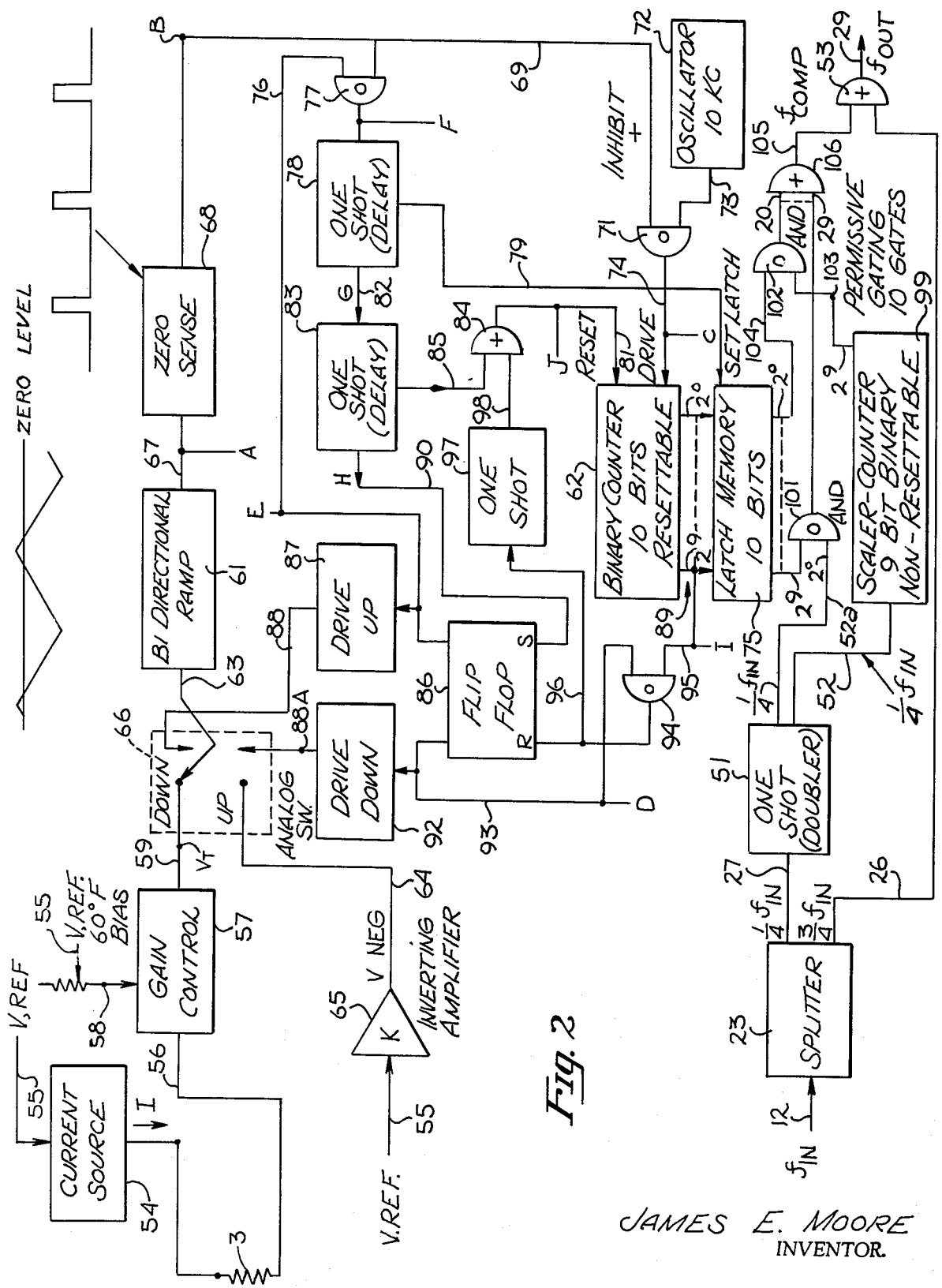
FIG. 2 is a detailed functional block diagram of the signal compensating portion of the apparatus of FIG. 1.

Referring to FIG. 2, the pulse-train signal Fin on line 12 is supplied to pulse splitter 23. Typically, pulse splitter 23 may comprise a two-stage binary circuit having appropriate logic so as to provide one pulse on line 27 for every three pulses on line 26. The ¼ Fin signal (on line 27) is doubled in frequency (½ Fin) by means of producing differentiated pulse trains at the leading edge line 52a and trailing edge line 52 of the output pulse of the one-shot multivibrator 51. These pulses are supplied through a digital compensating circuit (to be described in detail in connection with the descripption of FIG. 3) which affects the temperature compensation. Ultimately, the compensating pulses derived from lines 52, 52a are combined with three-fourths of the input pulses (¾ Fin) on line 26, via OR gate 53, and the output signal Fnet appears on line 29. The output of the digital compensating circuit (line 105) can range from 0 to 2 times its input, depending upon the measured temperature of the fluid. This is the equivalent of a ±25 percent correction.

The constant-current source 54 supplies a current I to the temperature probe 3 to develop an analog voltage proportional to the probe resistance (and hence the temperature of the fluid being measured). The effect of connecting cable resistance can be eliminated with a modified bridge compensating network of known construction. The current source is controlled from a stable reference voltage Vref. derived from a suitable source 55, not shown. As the fluid temperature increases, the voltage on line 56 will increase. In a typical construction, the voltage on line 56 may be set at 2.000 volts at the standard temperature of 60°F., and increases with increasing fluid temperature in direct proportion to the increase in the resistance of the probe 3.

Gain control 57 provides a means for adjusting the analog signal to conform to the average change in the relative volume of the fluid. The adjustment range is 0.00000 to 0.19999 percent/F. The reference voltage on line 58 biases the gain control amplifier so that a fixed signal of 2.000 volts will be produced on output line 59 at a fluid temperature of 60°F., regardless of the gain setting. The gain control 57 comprise a summing differential amplifier having as its positive input 58 the bias voltage. The negative input 56 comprises the voltage derived from the temperature probe 3. The output on line 59 is the difference voltage; as the temperature increases, the output on line 59 will fall below 2.000 volts. A temperature below 60°F. will produce an output voltage on line 59 which is greater than 2.000 volts. The output voltage (at line 59) may be expressed as: Vout = 2.000 volts− (Vin − 2.000 volts) × amplifier gain. Gain control amplifier 57 is an inverting amplifier to provide a negative going output in response to an increasing fluid temperature. An increased fluid temperature results in a lighter fluid and hence the need to reduce the net output frequency. In the alternative, means could be provided to set gain control circuit 57 in a non-inverting mode to provide an increasing output for increasing transducer input signals in the event that pressure or density compensation is required in lieu of temperature control. An increase of pressure and density has the effect of increasing fluid weight resulting in the requirement for a greater output frequency.

The analog voltage representing the measured fluid temperature is converted to a digital form for further signal processing. The analog-to-digital conversion is by dual slope integration and comprises a bidirectional ramp generator 61, a 10-bit binary resettable count-up counter 62, and related digital control logic. The input 63 to the ramp generator is obtained alternately from the gain control 57, via line 59, and a source of negative reference voltage via line 64. The negative reference 64 is derived from voltage source 55 through inverting amplifier 65, and comprises a −2.000 volt signal.

The stability of analog computations is maintained by referencing the gain control circuit 57, the current source 54 and the inverting amplifier 65 to a common reference voltage 55. A change in the reference voltage 55 will have an equal effect on the output of all three circuits resulting in no net change in the analog computations.

Analog switching circuit 66 will permit a capacitor in the bi-directional ramp circuit 61 to charge towards a negative voltage from zero when the switch 66 is in the condition shown in FIG. 2, and towards a positive voltage when the switch is in its alternate condition. The first-mentioned condition is called the "drive-down" mode and the rate at which the negative-going charge on the capacitor proceeds from zero is determined by the magnitude of the positive signal voltage on line 59. As mentioned previously, the signal on line 59 is dependent on the gain setting of control 57 and the temperature. Counting in counter 62 will commence when the drive-down ramp reaches zero level and continue until a total of 512 counts are accumulated in the 10-bit counter 62. The negative voltage level obtained in the capacitor of ramp 61 when the count in counter 62 reaches 512 is proportional to the measured temperature.

When the counter 62 reaches the 512the count ($2^9$ digit), the analog switch 66 will be transferred to its alternate, or reset, condition. This action will initiate a "ramp-up" mode of operation in which the capacitor will receive a positive-going charge at a fixed rate determined by the fixed negative reference voltage on line 64. At the same time that the ramp-up mode is started, the counter 62 will be reset to permit counting to commence from the zero state.

Figure 3:
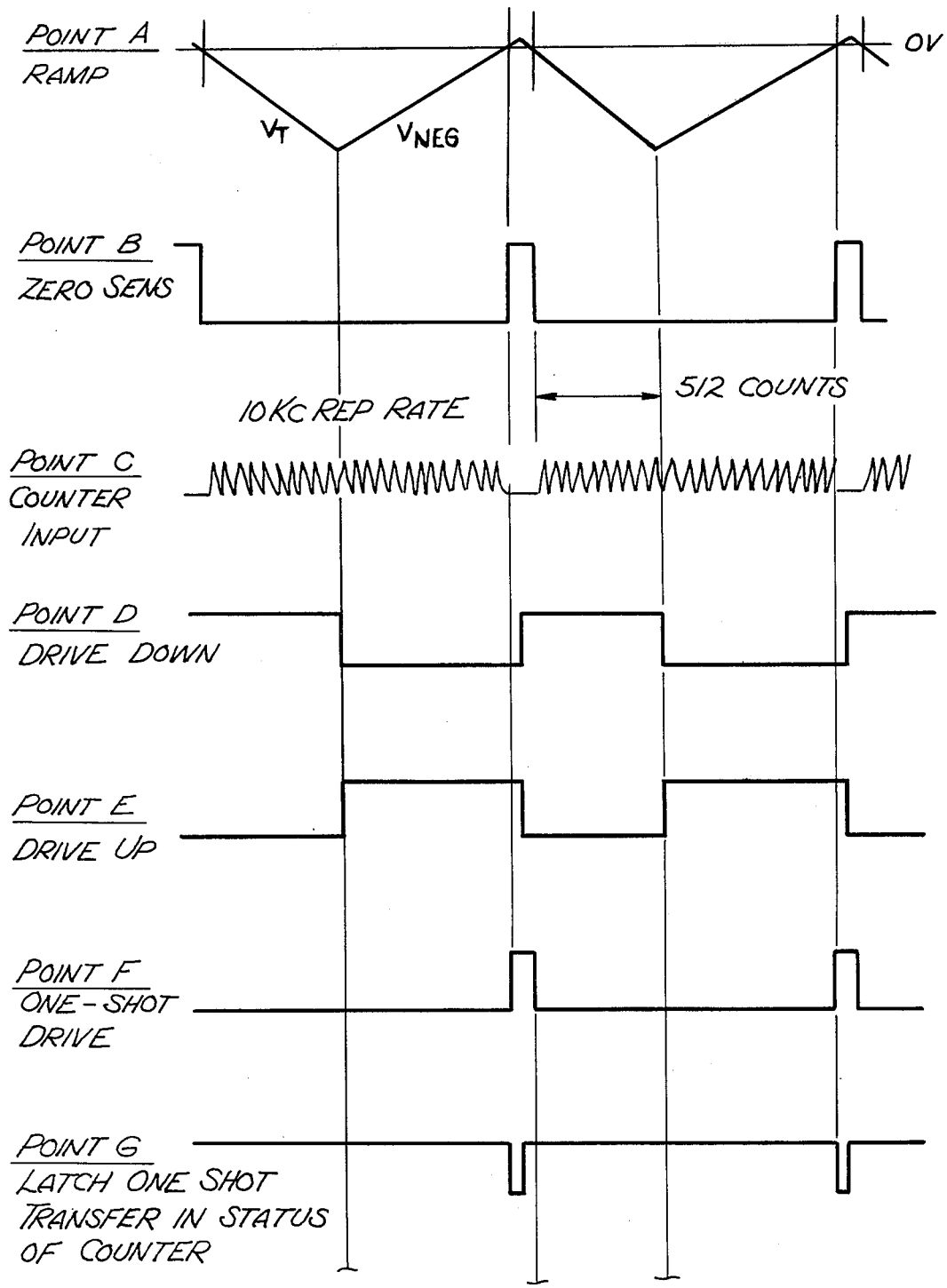
FIG. 3 is a waveform timing chart useful in the exposition of the apparatus of FIG. 2.
Figure 3:
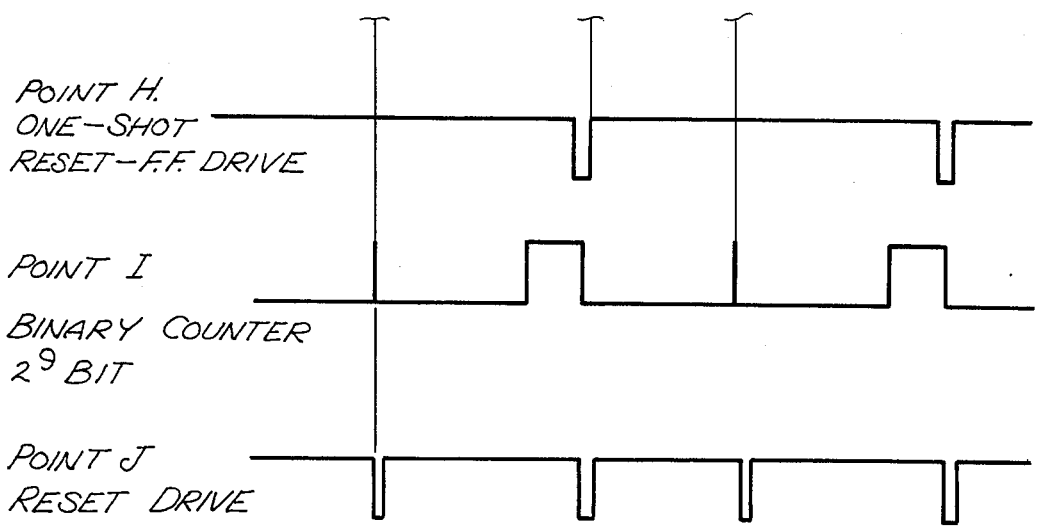

The waveform appearing at the output 67 of ramp 61 (point A) is shown at the top of FIG. 3. Whenever the output 67 of ramp 61 returns to zero volts, zero-sense detector 68 will produce a short-duration positive pulse (called the zero-sense pulse) at its output 69 (Point B). This pulse is supplied to gate 71, thereby inhibiting the passage of count pulses from free-running oscillator 72 to counter 62. Count pulses from oscillator 72 are passed during the drive-up and drive-down phases of the operating cycle, but are inhibited temporarily whenever the ramp generator charge above zero volts.

Oscillator 72 generates count pulses at a nominal 10 kilohertz rate and supplies them to counter 62 via line 73, inhibitor gate 71, and drive input 74 (point C). Changes in the oscillator frequency do not affect circuit stability since they have an equal effect on both the ramp-up and ramp-down segments of the bi-directional ramp generator.

The pulse on line 69, in addition to inhibiting the count pulses when the ramp (Point A) is at zero, also serves as a "set latch" pulse (line 79) for setting the final value of the counter 62 in 10-bit latch memory 75. The arrival of the zero-sense pulse (line 69) when there is a signal representing a drive-up status on line 76 at the inputs of AND gate 77 will trigger the one-shot multivibrator 78 and thereby generate the set-latch pulse on line 79. The one-shot drive pulse appears at the gate output (Point F).

The latch memory 75 comprises a 10-bit memory circuit which stores the binary number which has been accumulated in the binary counter 62 at the time of zero crossing. The transfer of the accumulated count into the memory latch is in a parallel mode via lines 89 corresponding to digits $2^0$ through $2^9$. The number of counts accumulated during the drive-up phase of the operating cycle is dependent upon the temperature-responsive variable voltage appearing at line 59. An increase in voltage at line 59 (corresponding to a lower fluid temperature) will cause the ramp voltage to charge to a more negative value during the drive-down portion of the operating cycle. In this instance a longer time will be required for the ramp to recharge to zero volts. Thus, a larger total count will be accumulated in the counter 62.

As can be seen, the measurement operation is directly proportional to the fluid temperature. The negative bias voltage on line 64 is adjusted so that a count of 512 will be accumulated when the fluid temperature is 60°F.

Coincident with the reset of counter 62 (previously described), the toggle circuit comprising flip-flop 86, and its associated logic elements, will change state. This action is in response to the occurrence of the flip-flop drive pulse on line 90. The resulting switch action activates drive-down control 92, via line 93, causing a positive input to be supplied to the ramp 61. This will cause ramp 61 to charge in the negative direction. The negative-going output of the ramp 61 will recross zero, activating the zero-sense detector 68 so as to produce a zero-sense pulse on line 69. A count will then begin accumulating in counter 62. The drive-down control pulse on line 93 is also supplied to enable AND gate 94 to reset flip-flop 86 when the other input representing the $2^9$ digit of counter 62, via line 95 occurs (Point I).

The counter 62 will count from zero until 512 counts have been received and the output of the $2^9$ digit register switches to a positive state. This action will cause a control signal to appear on line 95 and reset the flip-flop 86 via gate 94. The ramp will now charge in a positive direction. Concurrent with this action, the output of gate 94, appearing on line 96, will trigger the one-shot multivibrator 97. A pulse is obtained on line 98, from multivibrator 97, which passes through gate 84 to reset the counter 62.

The input signals F in on lines 52, 52a comprise a train of positive pulses. The pulses on line 52 are supplied to a 9-bit recycling binary scaler counter 99. This counter 99 is so constructed that only one of the nine counting states $2^1$ through $2^9$ will make a positive transistion (from 0 to 1) for each input pulse. Additionally, the $2^0$ stage (line 52a) will change to its positive state for every input pulse but not in coincidence with the positive pulses $2^1-2^9$ produced by counter 99. The $2^1$ stage will change (and thereby generate an output) for every two input pulses, the $2^2$ stage will provide an output for every four input pulses, and so on. The $2^9$ stage will produce an output once for every 512 input pulses applied to line 52.

A plurality of AND gates compare the states of the storage registers in the latch memory 75 with the states of corresponding counting stages of counter 99. AND gate 101 compares the state of counter stage $2^0$ preceding counter 99 with the $2^9$ bit register of memory 75; AND gate 102 similarly compares the state of counter stage $2^9$ (via line 103) with the $2^0$ bit register (via line 104). The remaining gates ($2^1$ through $2^8$) have been omitted for clarity. Each binary output pulse $2^0-2^9$ is differentiated. The differentiated pulses are allowed to pass through the corresponding AND gate (e.g., 101 or 102) only if the corresponding state of the latch memory 75 is in the positive (viz, true) state. The gated outputs from the AND gates (101, 102, etc.) are supplied as one input (line 105) to OR gate 53, via 10-input OR gate 106. Thus, the 10 dual-input AND gates (101, 102, etc.) will produce an output pulse on line 105 (in response to a differentiated input pulse) only if there exists a corresponding true state in the 10-bit latch memory. The produced output pulse, on line 105, comprises a negative-going pulse having a pulse width of 2 microsec.

Summarizing, a fluid temperature 60°F. will produce a temperature neasurement voltage of 2.000 volts at line 59. This will produce an accumulated count of 512 in counter 62. With this count, only the $2^9$ stage of the counter will be true and transferred into register $2^9$ of memory 75. When this is the case, only the $2^0$ pulse will transfer via gate 101 to the output (line 105). This is the only pulse which is equal in rate to the pulse into the compensating circuit and can be transferred to the output. At 60°F., therefore, one output pulse will be produced for every pulse.

If the fluid temperature is below 60°F., the voltage at line 59 will be greater than 2.000 volts and, therefore, more than 512 counts will be accumulated in counter 62. Thus, additional registers as well as the $2^9$ in the latch memory will be true. The $2^0$ differentiated pulses, as well as other less significant differentiated pulses, will pass through the AND gates to the output at line 105 thereby producing a greater number of output pulses than the number of input pulses received on line 52.

When the fluid temperature exceeds 60°F., the voltage at line 59 will be below 2.000 volts. For example, at 110°F. this voltage may be 1.600 volts. As a consequence, the stored count in latch memory 75 will be less than binary 512 counts, namely, binary 410 counts. Thus, the ratio of output pulses at line 105 to the input pulses at line 52 is less than 1.

Figure 3A:
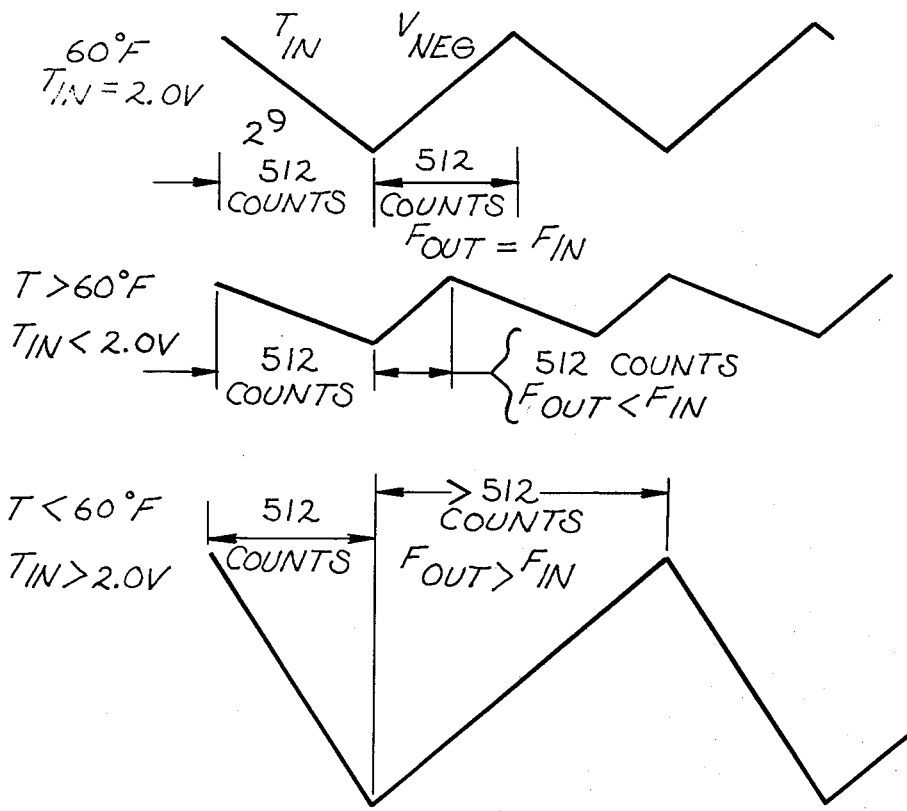
FIG. 3A is a waveform chart useful in the exposition of the apparatus of FIG. 2.

The effects of increasing and decreasing temperature are illustrated in the waveforms of FIG. 3A. The compensated output pulse train on line 105 is combined with the output on line 26, from splitter 23 representing three-fourths of the input pulse train F in to produce a net compensated frequency F net on line 29 from OR gate 53.

As stated previously, the output of the digital compensating circuit may range from 0 to 2 times the input Fin, depending upon the measured temperature.

The novel pulse splitting technique of the invention effectively increases the resolution of the compensating circuit from a range of 512 bits to a range of 2,048 bits (viz, 4 × 512 bits) which is the equivalent of a resolution of 0.05 percent at 60°F.

While the foregoing exemplary embodiments of the invention have been described in terms of systems for affecting a temperature compensation for fluid flow measurements, it should be understood that the invention may readily be adapted to various other applications, without the exercise of invention. For example, the process parameter to be compensated may be pressure, density, etc., in lieu of temperature, it being understood that any sensor capable of providing an appropriate electrical output may be substituted for probe 3. Also, the prime measurement need not be fluid flow, it being understood that any other transducer or device, which yields a variable pulse-train output corresponding to a parameter of interest, may be substituted for flow transducer 5. Also, the particular ranges, numerical count capacities, operating rates, etc., referred to in the description of the exemplary embodiments need not be limited to those set forth, since it will be readily apparent to those versed in the art that the underlying invention may be readily applied to a variety of process measuring applications.

It is to be understood that certain features and subcombinations are of independent utility and thus may be employed without reference to certain other features and subcombinations. This is contemplated by, and is within the scope of, the claims.

Since several possible embodiments may be made of the invention without departing from the scope thereof, it is to be understood that all matter set forth, or shown in the accompanying drawings, is to be interpreted as exemplary and not in a limiting sense.

What is claimed is:

1. Apparatus for compensating a first measured parameter of a continuous process in accordance with measured changes in a second parameter of said process, comprising:
    first transducer means for converting said first measured parameter into a series of discrete pulses;
    pulse dividing means for receiving said series of discrete pulses and directing a first fraction of said pulses into a first signal channel, and directing the remaining fraction of said pulses into a second signal channel;
        second transducer means for converting said second measured parameter into a corresponding analog signal,
        analog-to-digital conversion means for converting said analog signal to a corresponding digital signal;
        pulse multiplying means for multiplying the pulses in said first signal channel as a function of said digital signal to obtain a pulse output; and
        combining means for combining the pulse output from said second signal channel with the pulse output of said pulse multiplying means.

2. Apparatus as defined in claim 1 wherein first measured process parameter comprises volumetric flow, and said first transducer means comprises:
    a pulse-producing volumetric flowmeter.

3. Apparatus as defined in claim 1 wherein said second process parameter comprises fluid temperature;
    said multiplying means multiplies the pulses in said first signal channel to produce one discrete pulse in said first signal channel for each discrete pulse output from said first transducer means when said fluid temperature is at a given standard reference temperature, and generates a multiplying factor exceeding one to produce a ratio of output pulses in said first signal channel to output pulses from said first transducer means in excess of one when said fluid temperature is below said standard reference temperature, and generates a multiplying factor of less than one to produce a ratio of output pulses in said first signal channel to output pulses from said first transducer means of less than one when said fluid temperature is above said standard reference temperature.

4. Apparatus as defined in claim 1 wherein said pulse dividing means comprises:
    a pulse splitter for directing one out of every four pulses from said first transducer means into said first signal channel, and for directing the remaining three out of four pulses from said first transducer into said second signal channel.

5. Apparatus as defined in claim 4 including:
    pulse doubler means interposed in said first signal channel between said pulse splitter and said pulse combining means.

6. Apparatus as defined in claim 1 wherein said pulse combining means comprises:
    means for increasing the ratio of pulses to said first signal channel relative to the pulses from said first transducer means whenever said pulse train signal from said second transducer means changes in a first direction, and for decreasing the ratio of pulses from said first signal channel relative to the pulses from said first transducer means whenever said digital signal from said conversion means changes in a direction opposite said first direction.

7. Apparatus as defined in claim 1 wherein said pulse multiplying means includes:
    a number storage register for storing said digital number;
    a non-resetable recycling counter for counting the pulse output from said first signal channel; and,
    gating means responsive to the digital number stored in said register and the pulse output from said recycling counter to produce a net output pulse count which corresponds to the ratio therebetween.

8. Fluid flow measuring apparatus for compensating the measured flow in accordance with measured changes in fluid temperature, comprising:
    a pulse-producing volumetric flow-sensing transducer;
    means for generating a digital signal corresponding to the temperature of the measured fluid;
    pulse signal processing means;
    pulse splitter means interposed between said flow-sensing transducer and said pulse signal processing means for directing a first fraction of the output from said flow-sensing transducer into said pulse signal processing means and for directing the remaining fraction of the output from said flow-sensing transducer into a second signal channel, said pulse signal processing means being responsive to the pulses received from said flow sensing transducer, and the digital signal from said temperature-responsive generating means, for adding pulses to the pulses received from said transducer whenever said digital signal is greater than a given magnitude and for subtracting pulses from the pulses received from said transducer whenever said digital signal is less than said given magnitude, the pulses received from said transducer remaining uncompensated whenever said digital signal is the same as said given magnitude; and,
    pulse combining means for combining the output pulses from said pulse signal processing means with the output pulses in said second signal channel.

9. Apparatus as defined in claim 1 wherein said multiplying means multiplies the pulses in said first signal channel by a multiplying factor to produce a ratio of output pulses in said first signal channel, to output pulses from said first transducer means, in proportion to the ratio of said second parameter to its maximum value.

10. Apparatus as defined in claim 1 wherein said multiplying means multiplies the pulses in said first signal channel to produce one discrete pulse in said first signal channel for each discrete pulse output from said first transducer means when said second process parameter is at a given standard reference value, and generates a multiplying factor exceeding one to produce a ratio of output pulses in said first signal channel to output pulses from said first transducer means in excess of one when said second process parameter is below said standard reference value, and generates a multiplying factor of less than one to produce a ratio of output pulses in said first signal channel to output pulses from said first transducer means of less than one when said second process parameter is above said standard reference value.

11. Fluid flow measuring apparatus for compensating the measured flow in accordance with measured changes in fluid temperature, comprising:
   a pulse-producing volumetric flow-sensing transducer;
   means for generating a digital signal corresponding to the difference in the temperature of the measured fluid and a reference temperature, and the fluid expansion coefficient;
   pulse signal processing means;
   pulse splitter means interposed between said flow-sensing transducer and said pulse signal processing means for directing a first fraction of the output from said flow-sensing transducer into said pulse signal processing means and for directing the remaining fraction of the output from said flow-sensing transducer into a second signal channel, said pulse signal processing means being responsive to the pulses received from said flow-sensing transducer, and the digital signal from said temperature-responsive generating means, to produce a net pulse output having a ratio, relative to the pulse output of said transducer, which is in excess of one whenever said digital signal is greater than a given magnitude, and to produce a net pulse output having a ratio, relative to the pulse output of said transducer, of less than one whenever said digital signal is less than said given magnitude, the output of said transducer remaining uncompensated whenever said digital signal is the same as said given magnitude; and,
   pulse combining means for combining the output pulses from said pulse signal processing means with the output pulses in said second signal channel.

12. A measuring apparatus adapted for compensating the measured flow of a substance in accordance with a measured parameter of the substance, comprising:
   first transducer means for producing a train of pulses whose frequency is indicative of the measured flow;
   second transducer means for producing a binary coded signal which is representative of the measured parameter;
   means coupled to said first transducer means and responding to said train of pulses for applying a first series of pulses to one signal channel, for producing a plurality of other series of pulses which respectively comprise a number of pulses equal to various fractions of the number of pulses of said first series and with the pulses of the respective series being out of time coincidence, and for applying said plurality of other series of pulses on respective ones of a plurality of other signal channels; and
   gating means coupled in said one signal channel and in said plurality of other signal channels for controlling the passage of pulses therethrough as a function of said binary coded signal so as to cause the sum of the pulses passed therethrough to exceed the number of pulses in said first series of pulses whenever said binary coded signal is greater than a preselected reference value, to be less than the number of pulses in said first series whenever said binary coded signal is less than said preselected reference value, and to be the same as the number of pulses in said first series whenever said binary coded signal is the same as said preselected reference value; said gating means including a plurality of gating circuits with different ones of said gating circuits being coupled in different ones of said plurality of signal channels and wherein each of said gating circuits is controlled in response to a different binary bit of said binary coded signal;
   whereby the output pulses from said gating means are representative of the measured flow compensated in accordance with the measured parameter.

13. Measuring apparatus as defined in claim 12 wherein said second transducer means comprises:
   an analog temperature-sensing transducer; and
   an analog-to-digital converter responsive to the output of said temperature-sensing transducer to produce a digital number, the magnitude which corresponds to the temperature and temperature coefficient of a measured material.

* * * * *